No. 642,193. Patented Jan. 30, 1900.
J. BAEUMLE.
TELESCOPIC TUBE CLAMP.
(Application filed May 19, 1899.)
(No Model.) 2 Sheets—Sheet 1.

Witnesses.
C. H. Keeney.
Anna O. Faust.

Inventor.
John Baeumle
By Benedict & Morsell
Attorneys.

THE NORRIS PETERS CO., PHOTO-LITHO., WASHINGTON, D. C.

No. 642,193. Patented Jan. 30, 1900.
J. BAEUMLE.
TELESCOPIC TUBE CLAMP.
(Application filed May 19, 1899.)

(No Model.) 2 Sheets—Sheet 2.

Witnesses.

Inventor.
John Baeumle
By Benedict my Morsell
Attorneys.

UNITED STATES PATENT OFFICE.

JOHN BAEUMLE, OF MILWAUKEE, WISCONSIN.

TELESCOPIC TUBE-CLAMP.

SPECIFICATION forming part of Letters Patent No. 642,193, dated January 30, 1900.

Application filed May 19, 1899. Serial No. 717,387. (No model.)

*To all whom it may concern:*

Be it known that I, JOHN BAEUMLE, of Milwaukee, in the county of Milwaukee and State of Wisconsin, have invented a new and useful Improvement in Locks for Adjustable Shafts, of which the following is a description, reference being had to the accompanying drawings, which are a part of this specification.

My invention is of an improved device adapted for locking together the relatively adjustable members of a shaft, post, or analogous mechanical construction.

My novel device is especially adapted for locking the seat-post of a bicycle to the frame and for locking together the members of the steering or handle-bar post in a bicycle; but the device may be employed in any mechanical construction where two members of a post or shaft or a post and a frame are to be locked together and one cylindrical member is fitted or telescopes into a tubular member. In locking the two adjacent axial members of a shaft together a sleeve or tubular coupling over the adjacent ends of the shaft would be required, the sleeve or tubular coupling forming one of the members used with my locking device.

My invention consists of the device, its parts and combinations of parts, as herein described and claimed, or the equivalents thereof.

Figure 1:
Figure 2:
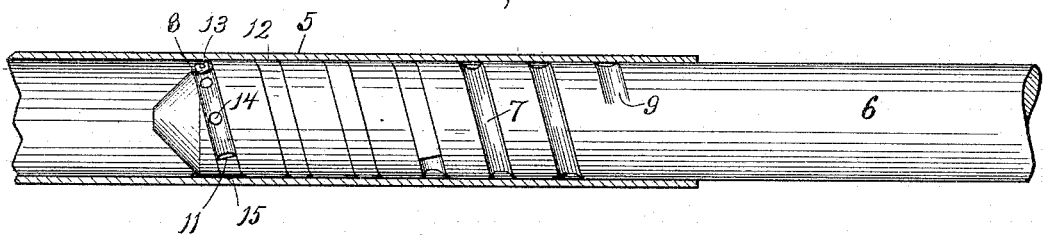
Figure 3:
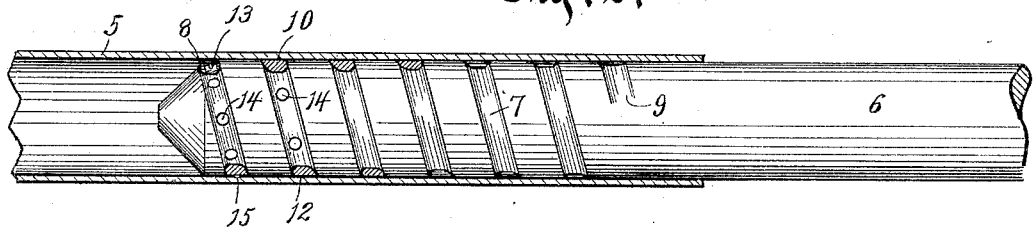
Figure 4:
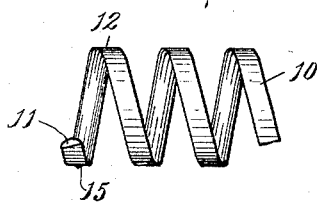
Figure 5:
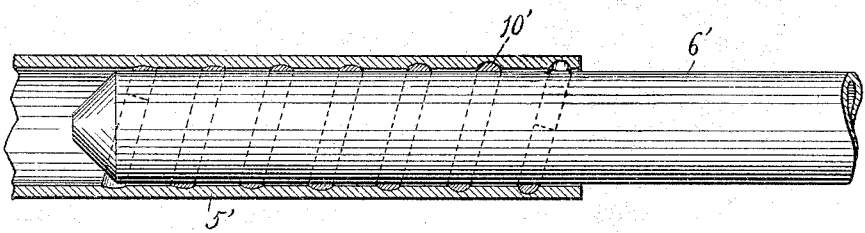
Figure 6:
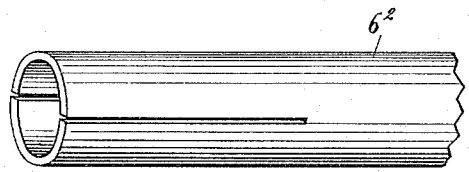
Figure 7:
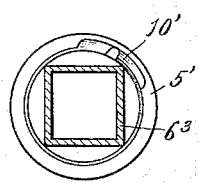
Figure 8:
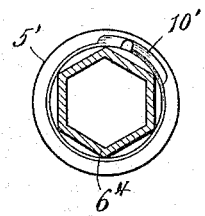

In the drawings, Figure 1 is an exterior view of fragments of the telescoping members of a shaft. Fig. 2 is another view of the fragments of the telescoping shaft, the exterior or inclosing shaft member being in section, exposing the construction of the interior shaft member normally within the outer shaft member and the locking member in position thereon. Fig. 3 is still another view of the fragments of the shaft, the outer shaft member and the locking member being in section. Fig. 4 is a detail of the locking member. Fig. 5 illustrates fragments of the shaft with the locking member, the parts being modified in construction, the outer member and the locking member being in section. Fig. 6 shows a modified form of the inner member. Figs. 7 and 8 are transverse sections of devices in the general form of that shown in Fig. 5, but in which the inner member is not of cylindrical form.

The shaft, post, or analogous mechanical construction with which my improved device is adapted to be used includes a tubular or hollow cylindrical outer member 5 and an inner adjustable member 6 of slightly-smaller diameter than the member 5 and fitted and adapted to slide or telescope in the member 5 to any desired extent at the extremities of the members that meet each other. In the form shown in Figs. 1, 2, and 3 the smaller cylindrical member 6 is provided with a spiral groove 7 in that portion of the member that enters the outer tubular member 5, which spiral groove is comparatively of considerable depth at and near the extreme end of the member 6 and gradually tapers in depth, becoming regularly of less and less depth in and about the cylindrical member 6 as it advances thereon from the outer end at 8 to the inner end of the groove at 9. A spiral wedge or key 10 is fitted movably in the spiral groove 7, the thickness of the wedge or key being such that when coiled snugly in the groove 7, with its outer extremity 11 substantially at the outer end of the groove at 8, the wedge or key just fills the groove throughout the entire extent of the key therein, the flat exterior surface 12 of the spiral wedge being flush with the adjacent surface of the cylindrical member 6. The spiral wedge or key 10 is, however, constructed of elastic metal and when placed in the groove in the member 6 is slightly expanded, so as when in position in the spiral groove 7 and at the end of the cylindrical member 6 the key 10 will not fit snugly down into the groove, but being slightly expanded will project throughout its length slightly beyond the surface of the cylindrical member 6. The cylindrical member 6, with the spiral key 10 in place loosely in the spiral groove 7 at the end of the member 6, is then inserted in the tubular member 5, the key 10 by reason of its elasticity being adapted to be so compressed as to be substantially flush on its outer surface with the surface of the member 6 and in such condition to slide or telescope readily in the member 5, and when the two members are by such telescoping so adjusted with reference to each other as to be substantially in the position desired the member 6 is rotated in the member 5 in the direction of the turn of the screw or spiral inwardly, and thereby the member 6 is also rotated in the spiral key 10, which by reason of its adhering exterior surface engages the outer member 5 and is held against rotation, the member 6 turning in the spiral key 10 until the key comes to a part of the groove 7 that is so shallow as to cause the key 10 to fit tightly therein and to be forced outwardly thereby against the outer member 5, and thereby by the friction of the parts to clutch or lock the two members 5 and 6 to each other against rotation or endwise movement relative to the other.

An adjustable stop 13, consisting, preferably, of a screw, is adapted to be inserted in any one of the screw-threaded holes 14 behind the spiral key 10 and prevent its movement in that direction either out of the groove 7 or after the key shall have become worn or where the outer member 5 is a very loose fit on the member 6 to such part of the groove as is so deep as to receive the spiral key 10 therein without distending it sufficiently that its outer surface shall project beyond the surface of the member 6.

To adapt the key 10 to engage the non-geared member, its opposing surface may be roughened or provided with a little tooth or point 15.

In Fig. 5 a modified form of the device is shown, in which the exterior tubular member 5' is provided with the spiral diminishing key-groove instead of its being in the interior member, as in the device shown in Figs. 1, 2, and 3. The spiral key 10' is correspondingly fitted in this spiral groove in the exterior member, and the interior member 6' being inserted in the exterior member 5' and in the spiral key 10' and the members being rotated relatively to each other the key bears against the non-grooved member and is thereby brought to the shallower part of the groove and thereby wedges the members together, locking them in position.

In Fig. 6 a modified form of the interior member is shown, this modified form of the member $6^2$ being of tubular form and split for a distance from the end that is intended to be inserted in the exterior tubular member like the exterior member shown in Fig. 5, the interior member thus being made slightly compressible for a distance from its extremity.

In Fig. 7 a modified form of interior member $6^3$ is shown, which is square in cross-section, this member $6^3$ being adapted to fit in and bear at its corners against the inner surface of the exterior member 5' and also against the spiral key 10'.

In Fig. 8 a modified form of device is shown in which the interior member $6^4$ is in hexagonal form in cross-section, and this member is of such size as to fit in and bear against the inner surfaces of the members 5' and 10'.

These modified forms of construction are shown merely to indicate some of the variations in form that may be employed in constructing my device for locking two members of a shaft together against rotation, the purpose being to indicate that such variations of form or others of a similar character are within the spirit of my invention.

What I claim as my invention is—

1. In an adjustable shaft or analogous construction, the combination of a tubular member, a member fitted and telescopable in the tubular member, one of said members being provided with a spiral groove of diminishing depth along the line of its extent, and a spiral key of substantially the same thickness as the deepest part of said spiral groove fitted movably in said spiral groove and adapted to bear against and to frictionally engage the non-grooved member when the grooved member is rotated therein to bring the shallower part of the groove to the spiral key.

2. The combination of a tubular member, a member fitted and movable in the tubular member, the insertible member being provided with a spiral groove diminishing regularly in depth along its line, and a spiral key fitted movably in and filling the deeper portion of the spiral groove and having an exterior surface adapted to bear against and frictionally engage the inner surface of the exterior member when the interior member is rotated to bring the shallower portion of the spiral groove to the spiral key.

3. The combination of a tubular member, a member fitted and movable in the tubular member, one of said members being provided with a spiral groove diminishing regularly in depth along its line, a spiral key fitted movably in the deeper portion of the spiral groove and adapted to bear against and frictionally engage the surface of the non-grooved member when the grooved member is rotated to bring the shallower portion of the spiral groove to the spiral key, and a stop adapted to be inserted in the grooved member projecting into the groove at the rear of the spiral key to prevent movement of the key in the groove in that direction.

4. The combination with a tubular member, and a member fitted and adjustable in the tubular member, one of said members being provided with a spiral groove diminishing gradually in depth along its line, of an elastic expanding and compressible spiral key of a thickness substantially equal to the depth of the deepest part of said groove fitted in the groove and adapted to engage the non-grooved member against rotation relatively thereto.

In testimony whereof I affix my signature in presence of two witnesses.

JOHN BAEUMLE.

Witnesses:
  C. T. BENEDICT,
  ANNA V. FAUST.